United States Patent
Bauer et al.

(10) Patent No.: US 6,210,837 B1
(45) Date of Patent: Apr. 3, 2001

(54) ELECTRODE GRID FOR LEAD STORAGE BATTERIES

(75) Inventors: Jürgen Bauer, Hildesheim; Christine Standke-Thiemann, Hannover; Albert Tönnessen, Idstein, all of (DE)

(73) Assignee: Varta Batterie Aktiengesellschaft (DE)

( * ) Notice: Subject to any disclaimer, the term of this patent is extended or adjusted under 35 U.S.C. 154(b) by 0 days.

(21) Appl. No.: 09/298,148

(22) Filed: Apr. 23, 1999

(30) Foreign Application Priority Data

May 23, 1998 (DE) ............................................. 198 23 147

(51) Int. Cl.[7] .............................. H01M 4/64; H01M 4/72; H01M 4/66; H01M 4/68
(52) U.S. Cl. .......................................... 429/233; 429/245
(58) Field of Search ..................................... 429/233, 245

(56) References Cited

U.S. PATENT DOCUMENTS

| | | | |
|---|---|---|---|
| 4,125,690 | * 11/1978 | Bagshaw et al. | 429/226 |
| 4,228,580 | * 10/1980 | Matter | 29/527.7 |
| 4,343,872 | * 8/1982 | Nees et al. | 429/245 |
| 4,632,890 | * 12/1986 | Wang | 429/218 |
| 4,978,601 | * 12/1990 | Kim et al. | 429/245 |
| 5,120,620 | * 6/1992 | Nelson et al. | 429/225 |
| 5,128,218 | * 7/1992 | Tokunaga et al. | 429/57 |
| 5,298,350 | * 3/1994 | Rao | 429/245 |
| 5,672,181 | * 9/1997 | Warlimont et al. | 29/623.5 |
| 5,691,087 | 11/1997 | Rao et al. | |
| 6,057,059 | * 2/2000 | Kwok et al. | 429/235 |

* cited by examiner

Primary Examiner—Patrick Ryan
Assistant Examiner—L. Edmondson
(74) Attorney, Agent, or Firm—Schnader, Harrison, Segal & Lewis LLP

(57) ABSTRACT

Electrode grids for lead storage batteries comprise a lead alloy which, in addition to calcium and tin and, if appropriate, silver, contains of aluminum, the aluminum content being in the range of approximately 0.012% to 0.02% by weight, and the average grain diameter in the web and frame area of the grids is 200 $\mu$m–600 $\mu$m. Preferably, the aluminum content is in the range of approximately 0.014% to 0.02%, the calcium content is approximately between 0.04 and 0.06%, the tin content is approximately between 0.5 to 1.0%, and optionally 0.5 to 0.7%, and the silver content is approximately between 0.005 and 0.06%.

20 Claims, 2 Drawing Sheets

ELECTRODE GRID FOR LEAD STORAGE BATTERIES

TECHNICAL FIELD OF INVENTION

The invention relates to an electrode grid for lead storage batteries and a battery having an electrode grid, comprising a lead alloy which, in addition to calcium and tin and, optionally, silver, also contains aluminum.

BACKGROUND OF THE INVENTION

1.) Field of the Invention

Mechanical stability and good corrosion resistance are important demands imposed on electrode grids for lead storage batteries. These demands on a battery ensure that the battery can be assembled without defects and has a suitable service life even under considerable stresses, e.g. the constantly rising temperatures to which starter batteries are exposed in the engine compartment of motor vehicles. Conventional batteries comprise an anode, an electrolyte; and a cathode material, separated from the anode by a separator.

However, in principle electrode grids produced using the gravity die casting process may exhibit typical casting defects, such as internal shrink holes and hot cracking. In addition to the selection of suitable alloys, the avoidance of these casting flaws is a decisive factor for the quality of the grid with regard to defect-free manufacturing and service life of the battery. Therefore, in industrial practice it is necessary to produce crack-free cast grids, and this condition is one of the factors which determine whether lead alloys can be employed in particular for starter batteries. Alloys which despite having good corrosion behavior, still cannot be formed into crack-free electrode carriers are of no practical use.

Gravity die casting is the process generally used for producing grids. The process starts with rapidly filling a grid casting die with molten lead. The molten lead is typically in the temperature range of 480–510° C. The die temperature is approximately in the range from 150–200° C. After the metal has been cast into the die, the heat of the melt must be dissipated into the die body through the die walls, which are coated with die coating material, until the grid has completely solidified and has cooled sufficiently for it to be possible to remove the grid.

Geometries of the electrode grids have very different cross sections in the web and frame areas. Cooling in the die takes place at a rate which varies considerably in certain locations, so that after a short time areas which have already completely solidified will be located next to areas which are still to some extent molten. Mechanical stresses produced by the non-uniform cooling and the volume contraction during solidification may therefore readily lead to the formation of heat cracks in alloys beyond a certain solidification range. The tendency to form heat cracks may be additionally promoted by the formation of low-melting phases at the grain boundaries and is in principle more of a problem for alloys that solidify in coarse grains than alloys which solidify in fine grains.

The obligation to avoid heat cracks altogether results from their effects on the electrode grids in assembling the battery, on the electrical conductivity and, in particular, on the expected service life of the positive grids, which have to withstand constant corrosion stresses.

The mechanical loads encountered in the production steps of pasting, drying and assembly may cause grids with hot cracks or even completely severed webs or frames to be destroyed or deformed in such a way that the battery may fail prematurely, for example as a result of short circuiting. The electrical conductivity of the electrode grids of both polarities determines to a large extent the output of the battery in use and may be significantly impaired in particular by crack formation in the frame and, in particular, in the vicinity of the lug. Casting defects in these areas may not be tolerated under any circumstances.

The grids in positive electrodes are exposed to constant corrosive attack as a result of the potential applied to them, and this corrosive attack, in particular in view of the high service temperatures, imposes extremely high, constantly increasing demands on the mechanical integrity and corrosion resistance of the grids. Even small casting defects are rapidly widened by the corrosion and represent a threat to the conductivity and service life of the positive electrode grids. It is therefore imperative that, in addition to highly corrosion-resistant lead alloys, only stable, crack-free grids be used in positive electrodes.

2. Description of Related Art

Lead-calcium-tin alloys are used for large numbers of electrode grids of maintenance-free lead storage batteries. Wide application ranges are known for both the calcium content and the tin content; in particular, German Patent Application 2,758,940 discloses a precipitation-hardened lead/calcium alloy in which the relative tin/calcium atomic ratio is at least 3:1 and the calcium content lies between 0.02 and 0.1% by weight. The calcium content in this known alloy is preferably approximately 0.06% by weight, and in addition, according to this publication, it has proven advantageous to add silver in quantities of between 0.02 and 0.1%, preferably approximately 0.06%, to a lead/calcium alloy.

The same type of Lead-calcium-tin alloy is also described in U.S. Pat. No. 5,298,350 and in U.S. Pat. No. 5,691,087. These documents contain further information about the advantageous effects of the addition of silver that has already been mentioned in German Patent Application 2,758,940.

Moreover, the prior art of U.S. Pat. Nos. 5,691,087 and 5,298,350 further discloses the addition of aluminum to lead/calcium alloys when casting the alloy. In this case, 0.08 to 0.012%, for example, of aluminum is added to the initial alloy composition, the quantity of aluminum added being dependant on the melting temperature during the casting process. This addition of aluminum is intended to form a passive protective layer on the surface of the molten lead and thus to reduce oxidation of the calcium or calcium burn-off.

As stated in U.S. Pat. No. 5,691,087, it is assumed that the small concentration of added aluminum does not impair the corrosion resistance of grids cast from such an alloy. According to this patent, in addition to aluminum it is also possible to use any other desired material, which is suitable as an oxygen trap in the molten material. When producing and examining grids based on the above mentioned alloys, it has been found that they did not always have sufficient corrosion resistance and reliability for practical use, because cracks which occur occasionally impair the expected performance.

In principle, the known lead-calcium-tin-silver alloys do satisfy the demands placed on corrosion resistance for use in positive electrodes, but in practice their use is only advantageous for battery quality and battery service life if it is possible to produce crack-free grids using conventional manufacturing methods.

SUMMARY OF THE INVENTION

The object of the invention is to provide an alloy for electrode grids for lead storage batteries which, on the one hand, can be cast without problems and, on the other hand, has excellent properties in terms of its corrosion resistance.

In the case of an electrode grid this objective is achieved by the fact that the lead alloy which, in addition to calcium and tin, contains aluminum content in the range of approximately 0.012% to 0.02% by weight, and the aluminum content has an average grain size in the webs and in the frame of approximately 200 µm–600 µm. This grain size is for typical web diameters of 0.8–1.2 mm and frame widths of 1.5–5 mm. In electrode grids for starter batteries, this corresponds to approximately 4–25 grains in the cross section through the grid element in question. This measure reduces the considerable tendency to form heat cracks in the coarse-grained solidification microstructure which is established during solidification in grids made from the above mentioned alloys with an atomic ratio Sn:Ca>3:1.

BRIEF DESCRIPTION OF THE DRAWINGS

The advantages and features of the disclosed invention are best understood by reference to the following detailed description when read in conjunction with the drawings, wherein.

DETAILED DESCRIPTION OF THE INVENTION

Reference will now be made in detail to the present preferred embodiments of the invention.

Figure 1:
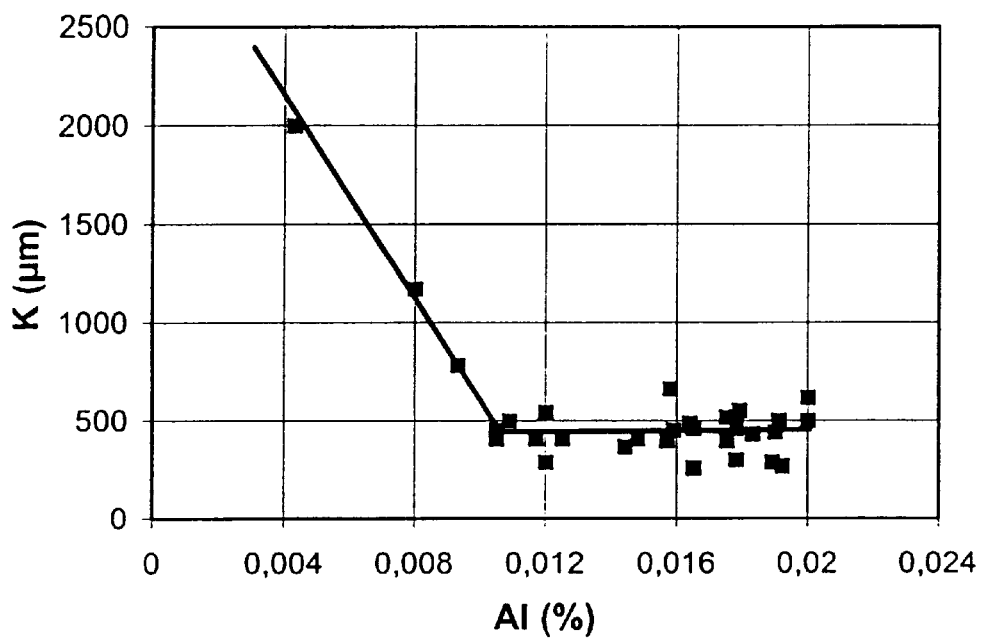
FIG. 1 is a graph charting the grain size against the aluminum content.

The relationship, according to the invention, between grain size and aluminum content in the alloy is illustrated in more detail by FIG. 1.

In FIG. 1, the grain size (K) in the frame of cast electrode grids is plotted against the percentage of aluminum content (Al). It can be seen that there is a surprisingly clear connection between aluminum content and grain size in the cast alloy. To obtain an electrode grid which is as far as possible free from cracks and therefore mechanically stable and resistant to corrosion, it is advantageous to set the average grain size so that there are between 4 and up to about 25 grains on a web or frame diameter. According to the invention, it is possible to achieve this grain size by suitably setting the aluminum content in the finished grid. In contrast to the previous use of aluminum merely to avoid calcium losses during the melting and casting operation, in the present invention aluminum is introduced specifically to change the microstructure, with the aim of avoiding the formation of cracks.

Advantageously, the aluminum content is approximately 0.014%, and the aluminum content in the electrode grid should not exceed 0.02% by weight.

The calcium content in alloys according to the invention lies approximately between 0.04 and 0.06%, the tin content lies approximately between 0.5 and 1.0%, preferably between 0.5 and 0.7%. The silver content should be approximately between 0.005 and 0.06%, and should be approximately 0.03%.

Figure 2:
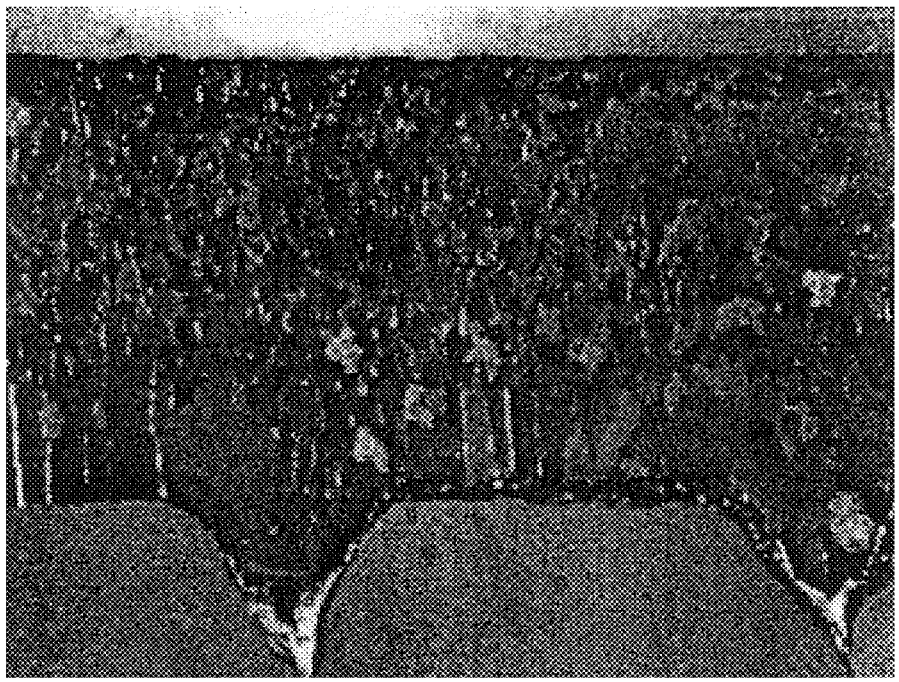
FIG. 2 is an enlargement of a cross section of a microstructure of one type of a lead/calcium alloy.
Figure 3:
FIG. 3 is an enlargement of a cross section of a microstructure of second type of a lead/calcium alloy.

FIGS. 2 and 3 show enlargements of a cross section of a microstructure (enlargement approx. 9:1) of lead/calcium alloys. FIG. 2 is an enlargement of a cross section of a microstructure of an alloy which comprises 0.054% Ca, 0.06% Sn, 0.03% Ag and 0.017% Al (in each case percent by weight). FIG. 3 shows an alloy containing the following components: 0.051% Ca, 0.64% Sn, 0.03% Ag and 0.0047% Al. As can be seen from the figures, the alloy in FIG. 2 produce a considerably smaller grain size of only 250 µm in the frame than the alloy of FIG. 3, which has a grain size of 2000 µm. One can therefore expect that the alloy of FIG. 2, with the increased aluminum content, will have a considerably reduced tendency to form heat cracks, so that it is fundamentally better suited for the production of electrode grids.

Figure 4:
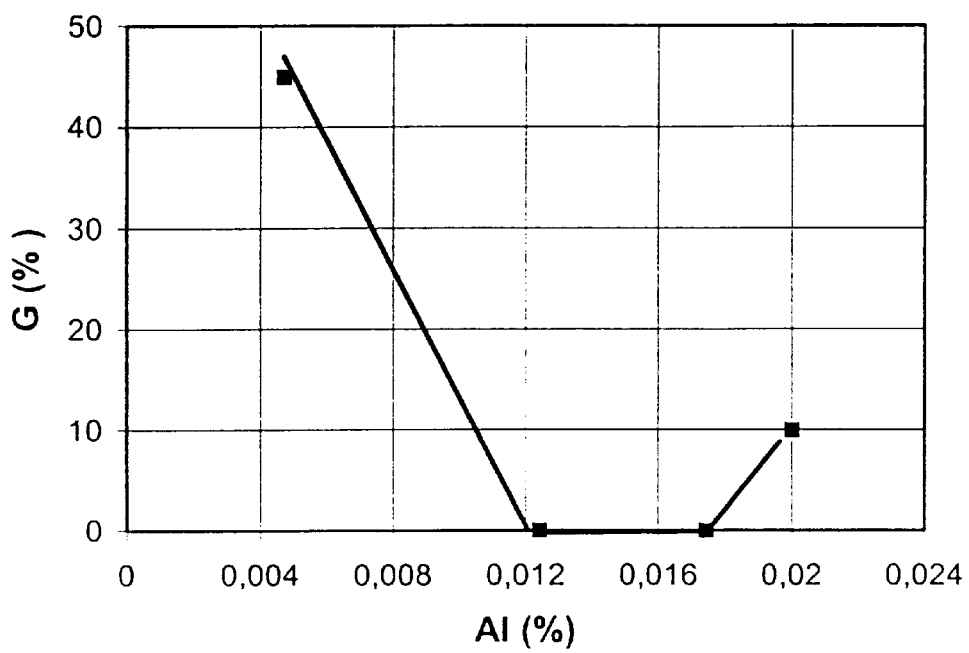
FIG. 4 is a graph charting the grid fracture against the aluminum content.

This surprisingly beneficial effect of aluminum on the properties of the electrode grid is clearly evident from the results of counting cracks on representative manufacturing batches of typical battery grids in the course of a series of casting tests using alloys of the compositions given above. FIG. 4 is a graph that charts the percentage of grid cracks (G) due to heat cracks against the percentage of aluminum (Al) content present in the grid. It can clearly be seen that only aluminum contents in the grid of more than approximately 0.012% by weight reliably prevents the formation of heat cracks. The slight rise when very high aluminum contents are used could result from the formation of disadvantageous low-melting phases including aluminum, which then counteract the initially advantageous effect of aluminum.

These results show that, in addition to the effect of aluminum on the grain size, it is actually possible to produce crack-free grids from the above mentioned alloys only by monitoring the aluminum content. The use of high aluminum contents according to the invention therefore significantly improves the casting quality and therefore improves the reliability and service life of the lead battery.

Although the invention has been described with reference to the above specified embodiment, this description is not meant to be construed in a limiting sense. Various modifications and changes thereto can be made by persons skilled in the art without departing from the scope and spirit of the invention as defined by the following claims.

We claim:

1. An electrode grid for lead storage batteries, comprising a lead alloy which, in addition to calcium and tin contains a crack formation resistant amount of aluminum, wherein the aluminum content is in the range of approximately 0.012% to 0.02% by weight and the average grain diameter is 200 µm–600 µm.

2. The electrode grid of claim 1, wherein the preferred range of the aluminum content is approximately between 0.014% to 0.02% by weight.

3. The electrode grid of claim 1, wherein the lead alloy also contains silver.

4. The electrode grid of claim 2, wherein the calcium content is approximately between 0.04 and 0.06% by weight.

5. The electrode grid of claim 1, wherein the tin content is in the range of approximately 0.5 to 1.0% by weight.

6. The electrode grid of claim 3, wherein the silver content is approximately between 0.005 and 0.06% by weight.

7. The electrode grid of claim 6, wherein the silver content is approximately 0.03% by weight.

8. A storage battery comprising conventional components for a storage battery and further comprising an electrode grid which comprises a lead alloy which, in addition to calcium and tin contains a crack formation resistant amount of aluminum, wherein the aluminum content is in the range of approximately 0.012% to 0.02% by weight, and the average grain diameter is 200 µm–600 µm.

9. The storage battery of claim 8, wherein the preferred range of the aluminum content is approximately between 0.014% to 0.02% by weight.

10. The storage battery of claim 8, wherein the lead alloy also contains silver.

11. The storage battery of claim 9, wherein the calcium content is approximately between 0.04 and 0.06% by weight.

12. The storage battery of claim 8, wherein the tin content is in the range of approximately 0.5 to 1.0% by weight.

13. The storage battery of claim 10, wherein the silver content is approximately between 0.005 and 0.06% by weight.

14. The storage battery of claim 13, wherein the silver content is approximately 0.03% by weight.

15. The electrode grid of claim 1, wherein the lead alloy is approximately 4–25 grains in cross-section.

16. The storage battery of claim 8, wherein the grid has a cross-section of approximately 4–25 grains.

17. An electrode grid for lead storage batteries comprising a frame and a web formed from a lead alloy which, in addition to calcium and tin, contains aluminum, wherein the aluminum content is in the range of approximately 0.012% to 0.02% by weight and the average grain diameter is 200 $\mu$m–600 $\mu$m, and wherein elements of the frame and/or the web have a cross-section of approximately 4–25 grains.

18. The electrode grid of claim 17, wherein components of the frame have a width of 1.5–5 mm and components of the web have diameters of 0.8–1.2 mm.

19. A storage battery comprising an electrolyte and at least one electrode grid comprising a frame and a web formed from a lead alloy which, in addition to calcium and tin, contains aluminum, wherein the aluminum content is in the range of approximately 0.012% to 0.02% by weight and the average grain diameter is 200 $\mu$m–600 $\mu$m, and wherein elements of the frame and/or the web have a cross-section of approximately 4–25 grains.

20. The storage battery of claim 19, wherein components of the frame have a width of 1.5–5 mm and components of the web have diameters of 0.8–1.2 mm.

* * * * *